United States Patent [19]

Ichikawa et al.

[11] Patent Number: 5,429,165
[45] Date of Patent: Jul. 4, 1995

[54] PNEUMATIC-SHAPED SOLID TIRE

[75] Inventors: Kouji Ichikawa, Kobe; Motoshi Tanigawa, Himeji; Takashi Nishimura, Kobe; Shigeki Yamanaka, Akashi; Kiyoshige Muraoka, Kobe; Ryozo Okada, Takarazuka, all of Japan

[73] Assignee: Sumitomo Rubber Industries, Hyogo, Japan

[21] Appl. No.: 208,201

[22] Filed: Mar. 10, 1994

Related U.S. Application Data

[63] Continuation of Ser. No. 913,932, Jul. 17, 1992, abandoned.

[30] Foreign Application Priority Data

Jul. 19, 1991 [JP] Japan ................................. 3-204655
Sep. 17, 1991 [JP] Japan ................................. 3-267046

[51] Int. Cl.⁶ .............................................. B60C 7/00
[52] U.S. Cl. ..................................... 152/302; 152/323
[58] Field of Search ............... 152/302, 323, 300, 315, 152/303

[56] References Cited

U.S. PATENT DOCUMENTS 2,525,196 10/1950 Bacon .

FOREIGN PATENT DOCUMENTS

| 1302223 | 7/1962 | France . | |
|---|---|---|---|
| 1305444 | 8/1962 | France . | |
| 1383874 | 11/1964 | France | 152/323 |
| 2160868 | 7/1973 | France . | |
| 1178315 | 9/1964 | Germany | 152/323 |
| 1480911 | 10/1969 | Germany . | |
| 2330276 | 12/1974 | Germany . | |
| 61-44005 | 3/1986 | Japan . | |
| 64-83405 | 3/1989 | Japan . | |
| 2051699 | 1/1981 | United Kingdom | 152/323 |
| 2130535 | 6/1984 | United Kingdom | 152/323 |

Primary Examiner—Geoffrey L. Knable
Attorney, Agent, or Firm—Birch, Stewart, Kolasch & Birch

[57] ABSTRACT

A pneumatic-shaped solid tire in which rim slip is improved, the tire main body (4) comprises a tread rubber layer (3) and a base rubber layer (2) made of a rubber composition having a JIS(A) hardness from 75 to 90 in which short cordlike or fiberlike reinforcing materials are not mixed, the thickness (TC) of the base rubber layer measured from the base line (BL) to the radially outer face thereof is 0.3 to 0.7 times the tire section height (TH), and the base rubber layer is provided therein with a radially inner band (7) and a radially outer band (6) which are spaced apart from each other in the radial direction of the tire, each of the bands comprising at least one ply of heat-shrinkable organic fiber cords laid at an angle from 0 to 15 degrees with respect to the tire circumferential direction.

9 Claims, 4 Drawing Sheets

PNEUMATIC-SHAPED SOLID TIRE

This application is a continuation of application Ser. No. 07/913,932 filed on Jul. 17, 1992, now abandoned.

The present invention relates to a solid tire, more particularly a pneumatic-shaped solid tire in which rim slip is improved.

BACKGROUND OF THE INVENTION

For industrial vehicles, e.g. forklift car, solid tires are widely used. A pneumatic-shaped solid tire is one of such solid tires. The pneumatic-shaped solid tire has a similar profile to a usual pneumatic tire and is mounted on a rim which is originally for the same size pneumatic tire.

For example, in each of Japanese patent publications JP-A-61-44005 and JP-A-64-83405, such a pneumatic-shaped solid tire is disclosed, wherein a tire main body is composed of three rubber layers, a radially innermost base rubber layer, a radially outermost tread rubber layer and an in-between cushion rubber layer. The base rubber layer is made of a rubber compound reinforced by short organic fiber cords mixed therewith in order to greatly increase the compressive elastic modulus or rigidity, which intends to improve the engaging force between the tire and rim. Further, the rigid base rubber layer extends over the radially outer edge of the rim flange, and a reinforcing cord layer is disposed at such a higher position being radially outward of the above-mentioned outer edge of the rim flange. Therefore, a great engaging force is obtained in the initial stage of the tire life.

However, when the base rubber layer is aged, the friction between the base rubber layer and the rim is reduced, and the rubber volume is slightly decreased. Accordingly, the engaging force is decreased. As a result, a slippage occurs between the tire and rim.

Even if it is assumed that the reinforcing cord layer produces a hooping force, the force can not reach to the rim because a rigid compressive resistant rubber layer exists therebetween. Accordingly, such a reinforcing cord layer can not prevent the rim slip.

Further, as the reinforcing cord layer is disposed near or at the boundary between the rigid base rubber layer and the relatively soft in-between cushion rubber layer, a separation failure of the cushion rubber was sometimes observed.

SUMMARY OF THE INVENTION

It is therefore, an object of the present invention to provide a pneumatic-shaped solid tire, in which rim slip is effectively prevented without using, for the base rubber layer, a rigid rubber composition reinforced by short organic fiber cords or similar materials.

According to one aspect of the present invention, a pneumatic-shaped solid tire has a main body comprising an annular base rubber layer inserted on a rim and an annular tread rubber layer disposed radially outside the base rubber layer, wherein the base rubber layer is made of a rubber composition in which short cordlike or fiberlike reinforcing materials are not mixed, the thickness (TC) of the base rubber layer measured from the base line (BL) to the radially outer face thereof is 0.3 to 0.7 times the tire section height (TH), and the base rubber layer is provided therein with a radially inner band (7) and a radially outer band (6) which are spaced from apart each other in the radial direction of the tire, each of the bands comprising at least one ply of organic fiber cords laid at an angle from 0 to 15 degrees with respect to the tire circumferential direction.

Preferably, the inner band and the outer band are positioned such that the radial heights (h6 and h7) thereof at the thickness center from the base line (BL) is in the range from 0.1 to 0.4 times the tire section height (TH).

BRIEF DESCRIPTION OF THE DRAWINGS

An embodiment of the present invention will now be described in detail in conjunction with the accompanying drawings, in which.

DETAILED DESCRIPTION OF THE EMBODIMENTS

Figure 1:
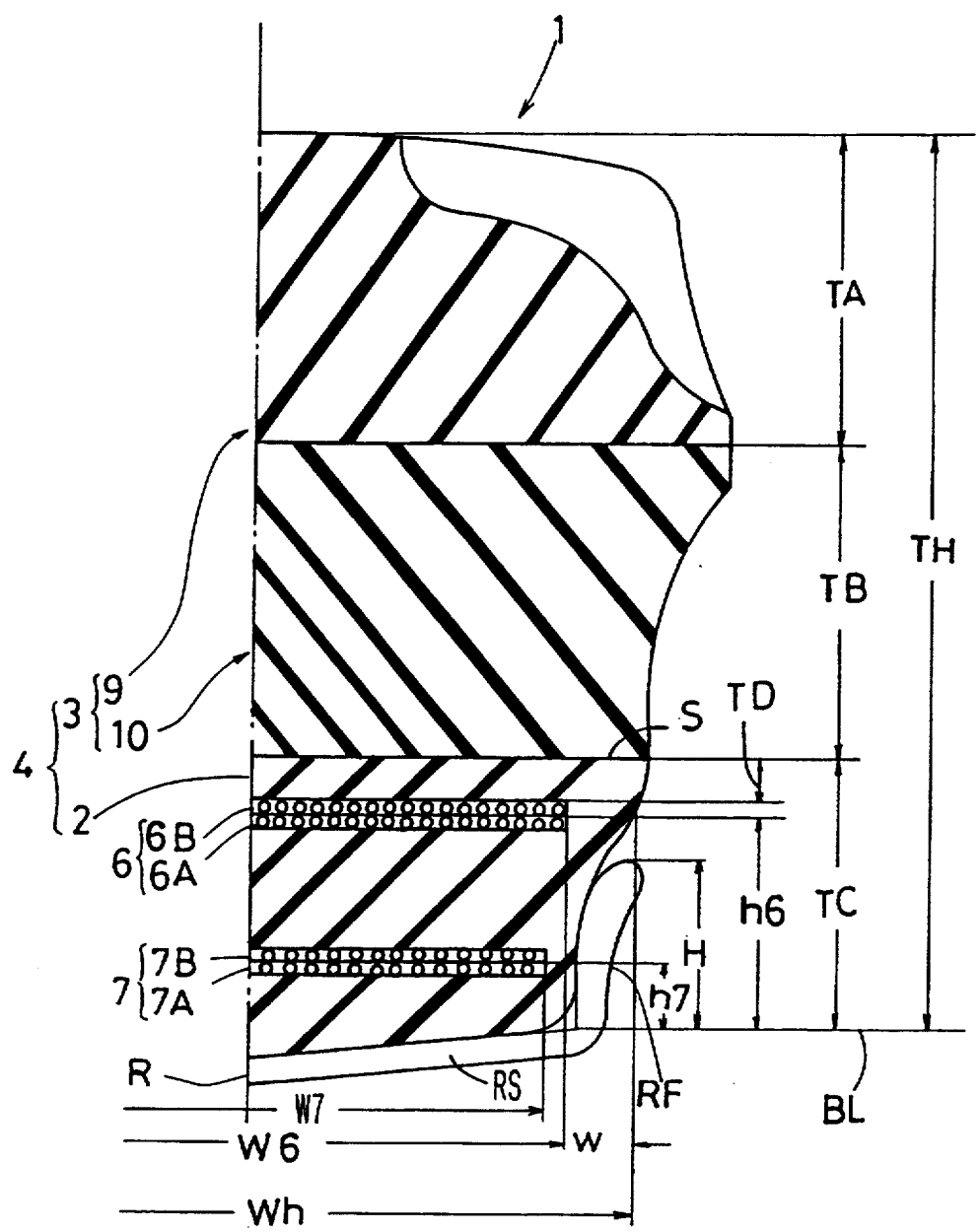
FIG. 1 is a cross sectional view showing a right half of a solid tire according to the present invention.

In FIG. 1, a pneumatic-shaped solid tire 1 has a main body 4 comprising an annular base rubber layer 2 and an annular tread rubber layer 3 disposed radially outside the base rubber layer 2, and the tire 1 is mounted on a rim R, which is originally for pneumatic tires having the same size as the tire 1, by inserting the base rubber layer 2 on the rim base RS between the rim flanges RF. The rim base RS includes a pair of seat portions that slope radially inward from each rim flange.

The base rubber layer 2 is made of a rubber composition having a JIS(A) hardness of 75 to 90, in which reinforcing materials such as short fibers, short cords and the like are not mixed.

The radial height TC of the base rubber layer 2 is in the range from 30 to 70% of the tire section height TH, and larger than the radial height H of the flange RF of the rim R, where each height is measured from the base line BL corresponding to the bead base line of the ordinary pneumatic tires.

In this embodiment, the tread rubber layer 3 is composed of a cushion rubber part 10 which is a radially inner annular part disposed on and around the radially outside of the base rubber layer 2, and a tread rubber part 9 which is a radially outer annular part disposed on and around the radially outside of the cushion rubber part 10.

As the radially outer surface of the tread rubber part 9 forms a tread face, a rubber composition having a JIS(A) hardness of 60 to 75 and being excellent in cut resistance and wear resistance is used for the tread rubber part 9. If the hardness is less than 60, the cut resistance and wear resistance are not good. If the hardness is more than 75, the grip performance of the tire is deteriorated.

For the cushion rubber part 10, a soft rubber compound having a JIS(A) hardness of 40 to 65 is used. For example, natural rubber and butadiene rubber containing 30 to 50 PHR of carbon black are preferably used. The thickness TB of the cushion rubber part 10 is preferably in the range from 25 to 50% of the tire section height TH. By providing such cushion part 10, ride comfort is improved. However, the cushion rubber part 10 may be eliminated from the tread rubber layer 3.

The above-mentioned base rubber layer 2 is provided therein with radially spaced bands, a radially outer band 6 and a radially inner band 7. The outer band 6 is composed of at least one ply, in this example two plies 6A and 6B, of parallel organic fiber cords. The inner band 7 is composed of at least one ply, in this example two plies 7A and 7B, of parallel organic fiber cords. The organic fiber cords in each ply 6A, 6B, 7A, 7B are laid at an angle of 0 to 15 degrees with respect to the tire circumferential direction. If the cord angle is more than 15 degrees, the hooping force is unfavorably decreased.

Preferably, the cord angles of the inner band 7 are 0 to 5 degrees, and in the outer band 6 the cord angles are larger than those of the inner band 7 and the adjacent plies are crossed to each other.

For the band cords, organic fiber cords, preferably heat-shrinkable cords, e.g. nylon, polyester and the like are used, and the band cords are embedded in a topping rubber whose 30% modulus is 40 to 150 kg/sq.cm.

The outer and inner bands 6 and 7 are positioned such that the radial heights h6 and h7 of the thickness center lines thereof measured from the bead base line BL are in the range of 0.1 to 0.4 times the tire section height TH.

$$0.4 \geq h6/TH > h7/TH \geq 0.1$$

Further, the radial height h6 of the outer band 6 is preferably more than 0.2 times the tire section height TH.

$$0.4 \geq h6/TH > 0.2$$

The space (h6–h7) between the inner and outer bands 6 and 7 is preferably in the range of 0.2 to 0.3 times the tire section height TH.

$$0.3 \geq (h6-h7) \geq 0.2$$

The radial distance TD measured from the radially outer face S of the base rubber layer 2 to the outermost band 6 is not less than 3%, preferably 5 to 10%, of the above-mentioned height TC of the base rubber layer 2, whereby separation between the base rubber layer and the tread rubber layer is prevented.

The width W6, W7 of each the band 6, 7 is more than 70% and less than 100% of the width of the main body 4 measured at the position of the band, preferably in the range of 75 to 85%. By retaining a width (w) (about 10% width) on each side of the band, the strength of the main body 4 is maintained.

Incidentally, in the case that the band is composed of a plurality of plies, the band can be formed by winding a plurality of strips one by one or by winding a long strip continuously a plurality of times. Further, the band can be formed by spirally winding a long narrow strip or ribbon in which one to several organic fiber cords are embedded therein.

Figure 2:
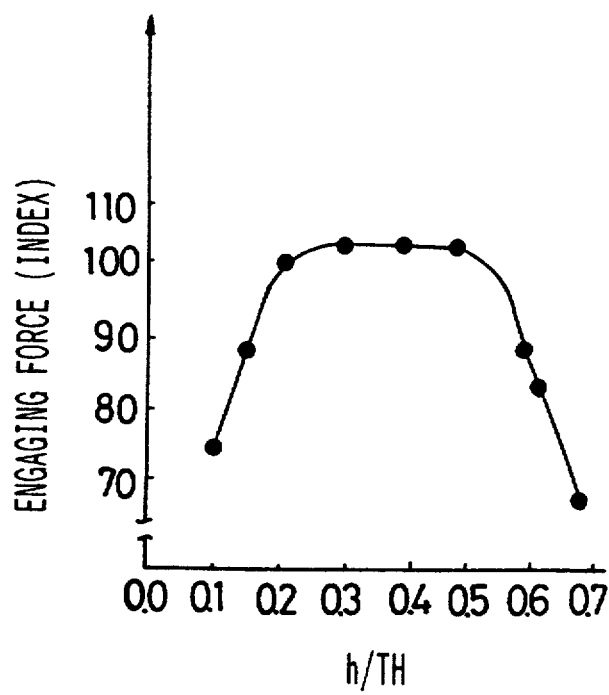
FIG. 2 is a graph showing the tire/rim engaging force as a function of the radial position of a solo band.
Figure 3:
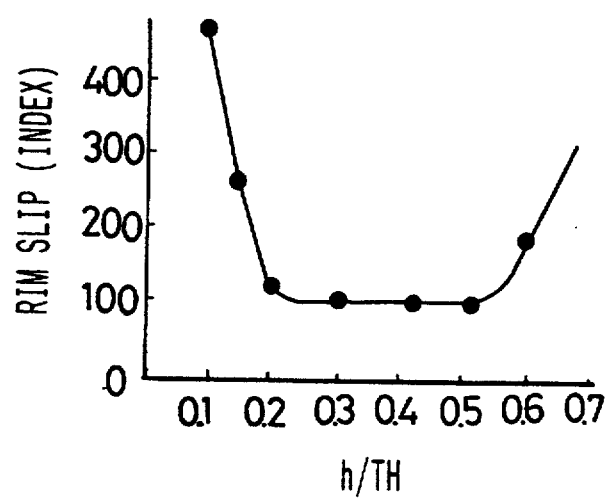
FIG. 3 is a graph showing the amount of rim slip as a function of the radial position of a solo band.
Figure 4:
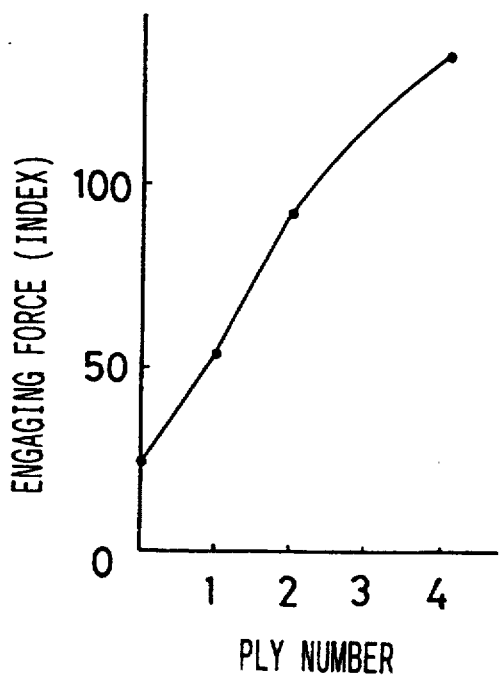
FIG. 4 is a graph showing the tire/rim engaging force as a function of the ply number in a solo band.
Figure 5:
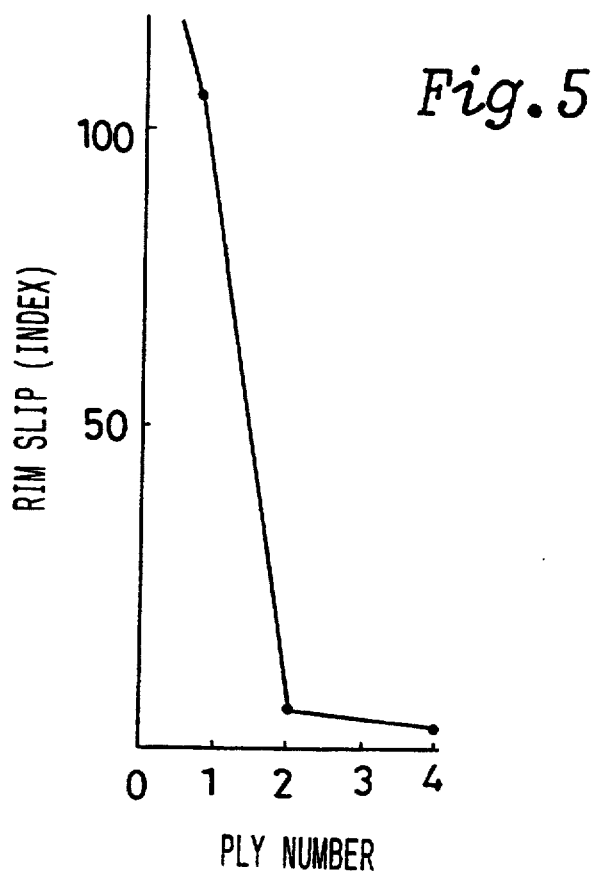
FIG. 5 is a graph showing the amount of rim slip as a function of the ply number in a solo band.

FIGS. 2–4 show the results of tests which were made to measure the tire/rim engaging force and the amount of rim slip. In the tests, a tire main body composed of a base rubber layer and a tread rubber layer composed of a tread rubber part only was used. The thickness (TC) of the base rubber layer was 50% of the tire section height (TH), and accordingly the thickness of the tread rubber layer was also 50% of the tire section height (TH). In the tire main body, one (1) band composed of at least one ply of 1500 d polyester cords whose cord count was 38 cords/5 cm was disposed. Changing the radial height (h) of the band and the number of the band ply, the tire/rim engaging force and the amount of slip were measured.

From the test results, the preferable ranges in the solo band were as follows: the radial height of the band measured from the bead base line to the band thickness center line is in the range of 20 to 60% of the tire section height, and the number of the band ply is in the range of 2 to 4. Further, the smaller the band cord angle to the tire circumferential direction, the larger the hooping Force. In the case of the solo band, 0 to 5 degrees is preferable.

Figure 6:
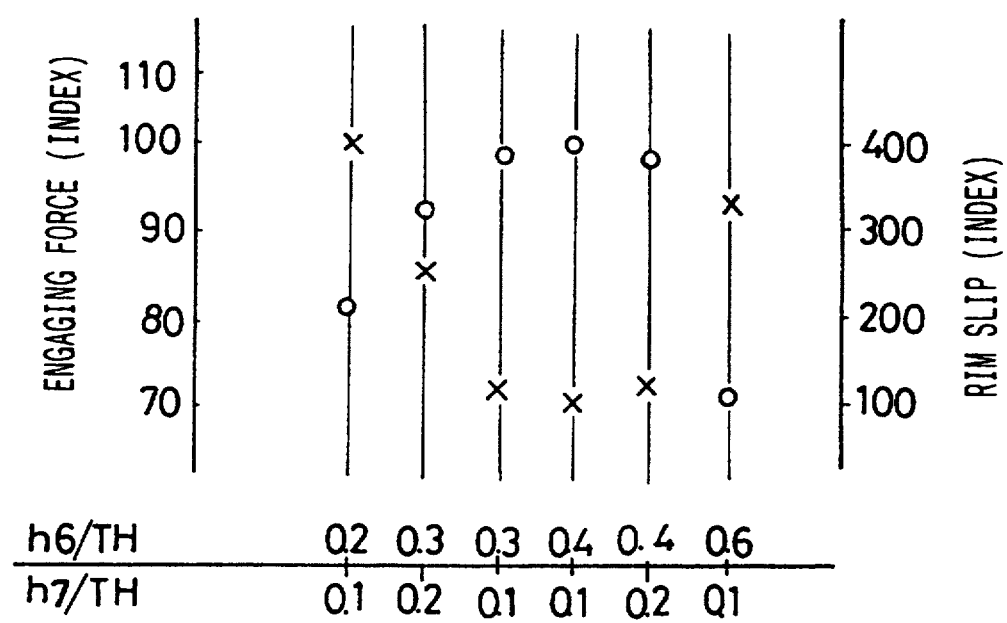
FIG. 6 is a graph showing the tire/rim engaging force and the amount of rim slip as functions of the radial positions of two radially spaced bands.

FIG. 6 shows the results of similar tests made with respect to test tires in which two radially spaced bands were disposed in the main body. In FIG. 6, the engaging force is indicated by a circle and the amount of rim slip is indicated by "X".

Table 1 shows the results of similar tests made with respect to Example tires 1–3 according to the invention and Reference tires 1–7. The specifications thereof are also given in table 1. The tire size was 7.00-12, and the rim size was 5.00 S. For the band cords, polyester fiber cords were used. For the base rubber layer of Reference tire 4, a rubber reinforced by short fiber cords was used.

The engaging force was measured as the maximum force to insert the tire on the rim by using an Amslet tester, a tire compression tester. The engaging force is indicated by an index based on the assumption that Example tire is 100. The larger the index, the larger the engaging force.

Using a forklift car provided with the test tire, the circumferential slippage of the tire caused relatively to the rim during running for 3 kilometer by a FIG. 8 turn was measured as the amount of rim slip.

With respect to Example tire 3 and Reference tire 4, a durability test was conducted. While a 2.5 ton forklift car was going and returning back on a 50 m test course, the time to starting of the slippage was measured as the durability. The durability is indicated by an index based on the assumption that Reference tire 4 is 100. The larger the index, the better the durability.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

|       | Ex. 1 | Ex. 2 | Ex. 3 | Ref. 1 | Ref. 2 | Ref. 3 | Ref. 4 | Ref. 5 | Ref. 6 | Ref. 7 |
|-------|-------|-------|-------|--------|--------|--------|--------|--------|--------|--------|
| TA/TH | 0.30  | 0.30  | 0.70  | 0.28   | 0.73   | 0.38   | 0.38   | 0.45   | 045    | 0.45   |
| TB/TH | 0.40  | —     | —     | —      | —      | —      | —      | —      | —      | —      |

TABLE 1-continued

|  | Ex. 1 | Ex. 2 | Ex. 3 | Ref. 1 | Ref. 2 | Ref. 3 | Ref. 4 | Ref. 5 | Ref. 6 | Ref. 7 |
|---|---|---|---|---|---|---|---|---|---|---|
| TC/TH | 0.30 | 0.70 | 0.30 | 0.72 | 0.27 | 0.62 | 0.62 | 0.55 | 0.55 | 0.55 |
| h6/TH | 0.40 | 0.40 | 0.30 | 0.40 | 0.20 | 0.50 | non | 0.50 | 0.30 | 0.40 |
| h7/TH | 0.10 | 0.20 | 0.10 | 0.30 | 0.10 | 0.10 | — | 0.5 | 0.10 | 0.20 |
| JIS(A) hardness of base rubber layer | 75 | 90 | 80 | 90 | 80 | 75 | 80 | 80 | 80 | 80 |
| Band cord angle (deg) | 0 | 5 | 3 | 2 | 10 | 8 | — | 5 | 7 | 5 |
| Band ply number | 2 | 2 | 2 | 2 | 2 | 2 | 0 | 2 | 2 | 3 |
| Engaging force (index) | 100 | 100 | 100 | 82 | 87 | 70 | 90 | 95 | 90 | 95 |
| Rim slip (index) | 100 | 100 | 100 | 180 | 270 | 400 | 200 | 150 | 200 | 200 |
| Durability (index) | — | — | 320 | — | — | — | 100 | — | — | — |

We claim:

1. A pneumatic-shaped solid tire having a main body comprising an annular base rubber layer mounted on a rim and an annular tread rubber layer disposed radially outside the base rubber layer, characterized in that the tread rubber layer (3) comprises a radially outer part (9) having a JIS(A) hardness of 60 to 75 and a radially inner part (10) having a JIS (A) hardness of 40 to 65, the thickness (TB) of said radially inner part (10) is in the range from 25 to 50% of the tire section height (TH), the base rubber layer consists of a rubber composition in which short cord fiber reinforcing materials are not mixed, a radially inner band (7) and a radially outer band (6), the bands being disposed within the rubber composition in spaced apart relationship in the radial direction of the tire, the thickness (TC) of the base rubber layer measured from a base line (BL) to the radially outer face thereof is 0.3 to 0.7 times the tire section height (TH), the base rubber layer having a JIS(A) hardness from 75 to 90, and each of the bands comprising at least one ply of organic fiber cords laid at an angle from 0 to 15 degrees with respect to the tire circumferential direction, the organic fiber cords in each band being heat-shrinkable cords, wherein the radial height (h6) of the thickness center line of the outer band (6) and the radial height (h7) of the thickness center line of the inner band (7) are each in the range from 0.1 to 0.4 times the tire section height (TH), and the space (h6–h7) between the thickness center line of each of the inner and outer bands (6 and 7) is in the range of 0.2 to 0.3 times the tire section height (TH).

2. The tire according to claim 1, wherein the radial height (h6) of the outer band (6) is more than 0.2 times the tire section height (TH).

3. The tire according to claim 1, wherein the outer band (6) is radially inwardly spaced apart from the radially outer face (S) of the base rubber layer (2) by a distance (TD) of not less than 3% of the thickness (TC) of the base rubber layer (2).

4. A combination of a pneumatic-shaped solid tire and a rim, the rim comprising a pair of rim flanges and a rim base therebetween, the pneumatic-shaped solid tire having a main body, the main body comprising an annular base rubber layer and an annular tread rubber layer disposed radially outside the base rubber layer, the tread rubber layer (3) comprises a radially outer part (9) having a JIS(A) hardness of 60 to 75 and a radially inner part (10) having a JIS (A) hardness of 40 to 65, the thickness (TB) of said radially inner part (10) is in the range from 25 to 50% of the tire section height (TH), the base rubber layer being mounted on the rim, being placed on the rim base and between the rim flanges, the base rubber layer consists of a rubber composition in which short cord fiber reinforcing materials are not mixed, a radially inner band (7) and a radially outer band (6), the bands being disposed within the rubber compositions, the thickness (TC) of the base rubber layer measured from a base line (BL) to the radially outer face thereof is 0.3 to 0.7 times the tire section height (TH), each of the bands comprising at least one ply or organic fiber cords laid at an angle from 0 to 15 degrees with respect to the tire circumferential direction, each of the radial height (h6) of the thickness center line of the outer band (6) and the radial height (h7) of the thickness center line of the inner band (7) being in the range from 0.1 to 0.4 times the tire section height (TH), and the radially inner band (7) and the radially outer band (6) being spaced apart from each other in the radial direction of the tire so that the space (h6–h7) between the thickness center line of each of the inner and outer bands (6 and 7) is in the range of 0.2 to 0.3 times the tire section height (TH).

5. The combination according to claim 4, wherein the base rubber layer has a JIS(A) hardness from 75 to 90, and the organic fiber cords in each ban are heat-shrinkable cords.

6. The combination according to claim 4, wherein the radial height (h6) of the outer band (6) is more than 0.2 times the tire section height (TH).

7. The combination according to claim 4, wherein the outer band (6) is radially inwardly spaced apart from the radially outer face (S) of the base layer (2) by a distance (TD) of not less than 3% of the thickness (TC) of the base rubber layer.

8. The combination according to claim 4, wherein the height (TC) of the base rubber layer is larger than the height (H) of the rim flanges as measured from the base line (BL).

9. The combination according to claim 4, wherein the rim base includes a pair of seat portions, one of said pair of seat portions being located axially inward of each said flange, and each said seat portion sloping radially inward from each said flange.

* * * * *